United States Patent [19]

Fannin et al.

[11] Patent Number: 4,826,665

[45] Date of Patent: May 2, 1989

[54] REMOVAL OF ALUMINUM ALKYL VAPOR FROM GAS STREAM

[75] Inventors: Loyd W. Fannin, Dickinson; Dennis B. Malpass, LaPorte; John R. Rohrer, Houston, all of Tex.

[73] Assignee: Texas Alkyls, Inc., Deer Park, Tex.

[21] Appl. No.: 166,578

[22] Filed: Mar. 10, 1988

[51] Int. Cl.$^4$ .................. B01D 47/00; B01D 53/02
[52] U.S. Cl. .................. 423/210; 423/245.2; 55/72; 55/84; 556/187
[58] Field of Search .................. 423/210, 245, 245.2; 55/72, 84; 556/187

[56] References Cited

U.S. PATENT DOCUMENTS

| | | | |
|---|---|---|---|
| 2,823,144 | 2/1958 | Dalton | 556/187 |
| 2,992,251 | 7/1961 | Shapiro et al. | 556/5 |
| 3,133,098 | 5/1964 | Cook et al. | 556/4 |
| 3,133,104 | 5/1964 | Johnston et al. | 556/4 |
| 3,218,343 | 11/1965 | Acciarri et al. | 556/187 |
| 3,326,953 | 6/1967 | Gautreaux | 556/187 |
| 3,363,021 | 1/1968 | Tucci | 556/187 |
| 3,403,495 | 10/1968 | Jaasma | 55/72 |
| 3,413,328 | 11/1968 | Feehs | 556/103 |
| 3,415,862 | 12/1968 | Ziegenhain | 556/187 |
| 3,445,493 | 5/1969 | Harwell | 556/187 |
| 3,696,161 | 10/1972 | Kobetz et al. | 556/187 |
| 3,853,657 | 12/1974 | Lawton | 156/180 |
| 3,935,098 | 1/1976 | Oda et al. | 55/72 |
| 4,330,478 | 5/1982 | Lynn | 423/245 |

FOREIGN PATENT DOCUMENTS

| | | | |
|---|---|---|---|
| 2632239 | 1/1978 | Fed. Rep. of Germany | 423/210 |
| 472902 | 8/1975 | U.S.S.R. | 423/210 |

OTHER PUBLICATIONS

"Condensed Chemical Dictionary", 9th Edition, G. Hawley, ed. (1977), p. 166

Primary Examiner—Robert L. Stoll
Assistant Examiner—Adriana L. Eng
Attorney, Agent, or Firm—Richard P. Fennelly; Louis A. Morris

[57] ABSTRACT

Aluminum alkyl vapor is removed from a gas stream by scrubbing with a hydrocarbon scrubbing liquid containing a long chain carboxylic acid dissolved therein.

5 Claims, No Drawings

REMOVAL OF ALUMINUM ALKYL VAPOR FROM GAS STREAM

BACKGROUND OF THE INVENTION

1. Field of the Invention

The present invention is directed to removal of small amounts of aluminum alkyl vapor from a gas stream, e.g., a plant vent gas stream.

2. Description of the Prior Art

During the preparation of aluminum alkyls it is common manufacturing practice to provide plant vent streams. In order to comply with environmental regulations, it is also common practice to treat such plant gas streams, which often contain small amounts of aluminum alkyl vapors, in an appropriate scrubber with a suitable absorbent, such as diesel oil, to absorb most of the amounts of aluminum alkyl from the gas stream. Any remaining trace quantities of aluminum alkyl vapor which would pass through the scrubber would then be removed by a flare burner before the gas stream is released to the atmosphere. Such trace quantities of aluminum alkyl not removed in the scrubbing operation, however, cause frequent plugging of the burner tips. In order to avoid possible violation of environmental regulations, the burner tip needs to be cleaned when the plant is not on stream. Such downtime for the plant to clean the flare is undesirable. Alternatively, in order to preclude downtime cleaning of the flare burner tip, a more regular preventive cleaning (e.g., two or three times per week) of the flare burner and/or installation of a second flare might be needed. These alternative schemes, however, are also economically undesired in regard to expenditure of time and/or money.

SUMMARY OF THE PRESENT INVENTION

The present invention relates to the removal of aluminum alkyl vapor from a gas stream by contacting the gas stream containing the aluminum alkyl vapor with a liquid scrubbing composition comprising a liquid hydrocarbon solvent containing dissolved therein a long chain carboxylic acid which is effective for removal of the aluminum alkyl by reaction and complex formation.

DETAILED DESCRIPTION OF THE PRESENT INVENTION

In order to remove the aluminum alkyl vapor from the gas stream, in accordance with the present invention, the gas stream containing aluminum alkyl (e.g., up to about 2 weight percent of aluminum alkyl in the gas stream) is contacted with the type of scrubber solution described below.

The predominant component (e.g., 75% to 95%, by weight) of the scrubber solution is a liquid hydrocarbon which is compatible with the aluminum alkyl in the sense of being substantially non-reactive with it. The term "substantially non-reactive" is meant to exclude degrees of reaction which would give rise to gas formation, fire, explosion or the formation of undesired by-products. The liquid hydrocarbon must be capable of dissolving the alkyl aluminum therein under such conditions of substantial non-reactivity. The use of solvents which contain potentially reactive moieties (such as oxygen, sulfur, nitrogen or halogen substituents) is not contemplated for use in regard to the instant invention. A liquid hydrocarbon, such as diesel oil, is especially useful since it is relatively cheap and fulfills the other requirements for the predominant component of the scrubber solution.

The other component of the scrubber solution is an effective amount of a long chain carboxylic acid which is readily dissolvable in the liquid hydrocarbon. This component can generally be present at from about 5% to about 25%, by weight of the scrubber solution. The carboxylic acid chosen should have a relatively long (e.g., $C_8$ to $C_{22}$) alkyl or alkenyl group attached to the carboxy group so as to preclude a too vigorous or violent reaction of the acid with the aluminum alkyl to be removed from the gas stream. Short chain acids, such as acetic acid, have a reactivity which is too vigorous for use in accordance with the present invention. It has also been found that the use of solid long chain carboxylic acids (such as stearic) may not be preferred, particularly if heat is needed to solubilize them into the liquid hydrocarbon component of the scrubber solution. The present invention requires a long chain carboxylic acid which is either preferably a liquid or, if solid, is easily dissolvable into the liquid hydrocarbon component and which remains in a dissolved form during the scrubbing operation.

The scrubber composition of liquid hydrocarbon and dissolved long chain carboxylic acid is brought into contact with the gas stream containing the undesired aluminum alkyl in order to remove it therefrom, e.g., by reaction and complex formation between the aluminum alkyl and the carboxylate functionality of the acid. Temperatures of from about 20° C. to about 40° C. and contacting times of from about 0.1 minute or longer are deemed appropriate.

The use of the present invention allows for the removal of aluminum alkyls, e.g., trialkylaluminums, without the generation of excessive heat or the formation of insoluble carboxylates. With use of oleic acid, for example, it was also found possible to trap rather large amounts (e.g., 4 moles of trimethylaluminum) for every mole of acid used. Should a surge of liquid aluminum alkyl occur, gas evolution would be much more slow than would be the case if aqueous acids were employed (e.g., 90% of gas evolution occurs within the first minute or so rather than instantaneously and explosively). It has also been found that foaming problems that might occur with use of a scrubber solution consisting of the liquid hydrocarbon solvent alone have not been found to occur, for example, when an acid such as oleic acid is present in the liquid hydrocarbon.

The present invention is further illustrated by the Examples which follow.

EXAMPLE 1

The equipment used in the scrubbing tests consisted of a series of three-neck glass flasks (300 milliliters) interconnected by glass tubing and a final cylindrical glass trap connected by a flexible plastic line. The first two flasks were fitted with fritted diptubes and stopcocks having rubber septa closures for transferring pyrophoric liquid with a syringe needle. The first flask contained 10 milliliters of trimethylaluminum (TMAL).

The second flask contained 100 grams of No. 2 diesel fuel oil that had been dried over molecular sieves and the third flask served as a surge reservoir between the scrubber flask and the sulfuric acid trap. The cylindrical trap containing a ¼-inch i.d. diptube was filled with 100 milliliters of 10% sulfuric acid with ⅛ inch glass beads in the liquid zone and glass wool in the vapor zone.

Dry nitrogen was passed through the system at 600 milliliters/minute under ambient conditions which carried about 2.5 grams/hour TMAL vapor. During the run of about three hours, much foaming occurred in the diesel scrubber and white solid formed inside the sulfuric acid diptube which completely plugged the tube a few times. Water vapor allowed formation of fine particles of aluminum hydroxide some of which escaped the acid trap and deposited as fluffy powder on the glass wool and passed out the vent as a white "smoke". Analyses of the diesel scrubber liquid and the sulfuric acid solution at the end of the run showed 2.54 grams of aluminum in the diesel and 0.06 gram in the acid trap indicating that about 97.7% of the TMAL vapor was trapped by the diesel scrubber.

EXAMPLE 2

Using the equipment and procedure described in Example 1, another run was made in which the scrubber liquid was diesel containing 10 weight percent oleic acid concentrate (EMERSOL 213, NF). During this run, no foaming occurred in the scrubber flask, no white solids formed in the sulfuric acid diptube or on the glass wool and no "smoke" passed from the vent. Analyses at the end of the 2.5 hour run showed 2.64 grams aluminum in the oleic acid/diesel scrubber liquid and 0.01 grams in the sulfuric acid solution which indicated 99.6% removal of TMAL vapor by the oleic acid/diesel scrubber. No insoluble material was formed in the scrubber liquid and no change in viscosity was observed.

EXAMPLE 3

Using the equipment and procedure described in Example 1, another run was made using 25 weight percent oleic acid/diesel as the scrubber liquid. After about 30 minutes of passing TMAL vapor through the scrubber liquid, the liquid became viscous like heavy mineral oil, but no solids formed. After about one hour into the run, the scrubber solution viscosity was about the same as it was initially and remained so throughout the remainder of the run. Only a very small amount of "smoke" was noted during the time of transient viscosity increase, but no white solids were formed in the sulfuric acid diptube or on the glass wool. Analyses at the end of the 2.75 hour run showed 2.17 grams of aluminum (only 8.6 grams TMAL used in this run) in the oleic acid/diesel liquid and nil aluminum in the sulfuric acid trap.

EXAMPLE 4

This experiment was designed to determine the capacity of oleic acid for scrubbing TMAL vapor. The same equipment was used as that described in Example 1 except that a thermocouple was inserted into the scrubber solution to monitor temperature with a strip-chart recorder. The scrubber liquid used was 5 weight percent oleic acid/diesel so that TMAL vapor breakthrough would occur earlier. The plastic line was disconnected from the sulfuric acid trap periodically so that the intensity of the white "smoke" could be observed. Initially, only very light "smoke" was noted in the vent gas, but after passing TMAL/$N_2$ vapor for 1.8 hours, the "smoke" increased to a heavy white "smoke" within about a five minute period. At this time, the gas flow was terminated and a sample of the scrubber liquid was taken for analysis. From aluminum found (1.73 grams) in the oleic acid/diesel solution and applying 80% acid content for the oleic acid concentrate, the molar ratio for TMAL/oleic acid was calculated to be about 4.5.

After removing a sample for analysis, the gas flow was begun again. Within the following 30 minutes, white solid formed inside the sulfuric acid diptube and on the glass wool. No insoluble material was formed in the scrubber liquid during the run.

Temperature in the scrubber rose a maximum of 10° C. during the first 15 minutes of the run and then decreased slowly to 5° C. above ambient after 1.8 hours.

EXAMPLE 5

Instant injections of several aluminum alkyls were made into 50-gram quantities of 10% oleic acid/diesel solution each of which was contained in a 220-milliliter beverage bottle capped with a rubber septum for syringe injection and fitted with an internal thermocouple and magnetic stirring bar. A needle inserted in the septum of the bottle was connected to a gas burette system that was filled with an aqueous salt-saturated solution. Temperature was recorded by a millivolt strip-chart recorder.

About 90% of the liberated gas reported in the Table below was evolved within the first minute after aluminum alkyl injection and the remainder was evolved over about a ten minute period. No solids were formed with any of the aluminum alkyls.

| | Instant Injection of Various Aluminum Alkyls into 50 grams of 10% Oleic Acid/Diesel | | | | |
|---|---|---|---|---|---|
| Aluminum Alkyl | Weight Injected, grams | Al/Oleic Acid Mole Ratio | Exotherm °C. | Theoretical Max. Gas Vol., ml | Gas Vol. Found, ml |
| Triethyl-aluminum | 0.83 | 0.52 | 26 | 350 | 330 |
| Ethylaluminum Sesquichloride | 0.76 | 0.42 | 18 | 350 | 165 |
| Diethyl-aluminum Iodide | 1.27 | 0.42 | 21 | 350 | 44 |
| Triisobutyl-aluminum | 1.17 | 0.42 | 25 | 350 | 65 |

EXAMPLE 6

Triethylaluminum (1.08 pounds) was injected instantly into 20 pounds of 5 weight percent oleic acid/diesel solution contained under nitrogen in a stirred ten gallon reactor vessel. An internal thermocouple attached to a strip-chart recorder indicated a maximum exotherm of 21.5° C. three minutes after injection. Pressure in the closed vessel rose to 4 psig instantly and was only 5 psig after five minutes.

The foregoing is intended to be illustrative of the present invention and should not, therefore, be construed in a limiting sense. The scope of protection sought is set forth in the claims which follow.

We claim:

1. A process for the removal of aluminum alkyl vapor from a gas stream which comprises scrubbing the gas stream with a scrubber composition comprising a liquid hydrocarbon containing a long chain carboxylic acid containing a $C_8$ to $C_{12}$ alkyl or alkenyl group dissolved therein.

2. A process as claimed in claim 1 wherein the long chain carboxylic acid comprises from about 5% to about 25%, by weight of the scrubber composition.

3. A process as claimed in claim 2 wherein the long chain carboxylic acid is oleic acid.

4. A process as claimed in claim 2 wherein the scrubber composition comprises diesel oil as the liquid hydrocarbon.

5. A process as claimed in claim 3 wherein the scrubber composition comprises diesel oil as the liquid hydrocarbon.

* * * * *

UNITED STATES PATENT AND TRADEMARK OFFICE
CERTIFICATE OF CORRECTION

PATENT NO. : 4,826,665

DATED : May 2, 1989

INVENTOR(S) : Loyd W. Fannin et al.

It is certified that error appears in the above-identified patent and that said Letters Patent is hereby corrected as shown below:

Claim 1, line 5, "$C_{12}$ alkyl" should read -- $C_{22}$ alkyl --.

Signed and Sealed this

Twentieth Day of February, 1990

Attest:

JEFFREY M. SAMUELS

Attesting Officer

Acting Commissioner of Patents and Trademarks